(12) United States Patent
McRae

(10) Patent No.: US 9,494,822 B2
(45) Date of Patent: Nov. 15, 2016

(54) THIN BACKLIGHT FOR LCD DISPLAYS THROUGH USE OF FIELD-INDUCED POLYMER ELECTRO LUMINESCENCE PANELS

(71) Applicant: Vizio Inc, Irvine, CA (US)

(72) Inventor: Matthew McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 263 days.

(21) Appl. No.: 13/789,392

(22) Filed: Mar. 7, 2013

(65) Prior Publication Data

US 2014/0253839 A1    Sep. 11, 2014

(51) Int. Cl.
*G02F 1/1335*    (2006.01)

(52) U.S. Cl.
CPC .......... *G02F 1/133602* (2013.01); *G02F 2001/133614* (2013.01)

(58) Field of Classification Search
CPC ............. G02F 1/133602; G02F 2001/133614
See application file for complete search history.

(56) References Cited

U.S. PATENT DOCUMENTS

| | | | | |
|---|---|---|---|---|
| 4,681,548 | A * | 7/1987 | Lemelson | 434/311 |
| 5,480,582 | A | 1/1996 | Pope | |
| 5,757,124 | A | 5/1998 | Pope | |
| 5,818,238 | A * | 10/1998 | DeVilbiss | 324/537 |
| 6,079,838 | A | 6/2000 | Parker et al. | |
| 6,160,596 | A | 12/2000 | Sylvester et al. | |
| 6,218,774 | B1 | 4/2001 | Pope | |
| 6,749,312 | B2 | 6/2004 | Parker et al. | |
| 6,755,547 | B2 | 6/2004 | Parker | |
| 7,057,790 | B2 | 6/2006 | Selbrede | |
| 7,160,015 | B2 | 1/2007 | Parker | |
| 7,165,873 | B2 | 1/2007 | Parker | |
| 7,195,389 | B2 | 3/2007 | Parker et al. | |
| 7,218,437 | B2 | 5/2007 | Selbrede | |
| 7,226,196 | B2 | 6/2007 | Parker et al. | |
| 7,300,194 | B2 | 11/2007 | Parker | |
| 7,322,730 | B2 | 1/2008 | Parker | |
| 7,354,184 | B2 | 4/2008 | Parker | |
| 7,374,305 | B2 | 5/2008 | Parker | |
| 7,384,177 | B2 | 6/2008 | Parker | |
| 7,404,660 | B2 | 7/2008 | Parker | |
| 7,404,661 | B2 | 7/2008 | Parker et al. | |
| 7,434,973 | B2 | 10/2008 | Parker et al. | |
| 7,434,974 | B2 | 10/2008 | Parker | |
| 7,467,887 | B2 | 12/2008 | Parker | |
| 7,522,354 | B2 | 4/2009 | Selbrede et al. | |
| 7,524,101 | B2 | 4/2009 | Parker | |
| 7,537,370 | B2 | 5/2009 | Parker | |

(Continued)

FOREIGN PATENT DOCUMENTS

WO    WO2013009958 A1 *  1/2013

OTHER PUBLICATIONS

Yonghua Chen, Gregory M. Smith, Eamon Loughman, Yuan Li, Wanyi Nie, David L. Carroll, Effect of Multi-walled carbon nanotubes on electron injection and charge generation in AC field-induced polymer electroluminescence, available online Nov. 9, 2012, Publisher: Elsevier, Organic Electronics 14 (2013), p. 8-18.*

(Continued)

*Primary Examiner* — Paul Lee
*Assistant Examiner* — Jia Pan
(74) *Attorney, Agent, or Firm* — Law Office of Scott C Harris, Inc

(57) ABSTRACT

A FIPEL device used as an illuminating part for a display.

31 Claims, 2 Drawing Sheets

(56) References Cited

U.S. PATENT DOCUMENTS

| | | |
|---|---|---|
| 7,563,012 B2 | 7/2009 | Parker |
| 7,703,967 B2 | 4/2010 | Parker |
| 7,736,043 B2 | 6/2010 | Parker |
| 7,780,329 B2 | 8/2010 | McCollum et al. |
| 7,798,695 B2 | 9/2010 | Parker |
| 7,959,341 B2 | 6/2011 | Erchak et al. |
| 7,963,687 B2 | 6/2011 | Parker |
| 8,014,057 B2 | 9/2011 | Selbrede et al. |
| 2003/0210040 A1* | 11/2003 | Kang et al. .................. 324/228 |
| 2003/0227254 A1* | 12/2003 | Terumoto ..................... 313/504 |
| 2005/0041009 A1* | 2/2005 | Kuroda ........................ 345/102 |
| 2005/0253789 A1* | 11/2005 | Ikeda ............................. 345/76 |
| 2006/0125373 A1* | 6/2006 | Lin et al. ..................... 313/495 |
| 2007/0109465 A1* | 5/2007 | Jung et al. ..................... 349/71 |
| 2010/0192171 A1* | 7/2010 | Dozoretz et al. ................. 725/5 |
| 2011/0133226 A1* | 6/2011 | Lee et al. ........................ 257/89 |
| 2012/0019434 A1* | 1/2012 | Kuhlman et al. .............. 345/1.3 |
| 2014/0252332 A1* | 9/2014 | Carroll ............... H01L 51/5012 257/40 |
| 2014/0361281 A1* | 12/2014 | Carroll ............... H01L 51/0036 257/40 |

OTHER PUBLICATIONS

Effect of multi-walled carbon nanotubes on electron injection and charge generation in AC field-induced polymer electroluminescence Yonghua Chen, Gregory M. Smith, Eamon Loughman, Yuan Li, Wanyi Ni, David L. Carroll.

\* cited by examiner

THIN BACKLIGHT FOR LCD DISPLAYS THROUGH USE OF FIELD-INDUCED POLYMER ELECTRO LUMINESCENCE PANELS

BACKGROUND

Current LCD display panels require that light be directed through the edge lit panel reflecting off of the back surface of the panel and emitted out of the front surface of the panel. The LCD panel itself is formed of a matrix of very small, referred to as pixel, openings also referred to as LCD gates. When a gate is switched open, light passes through until the gate is switched off. In color displays, each pixel is composed of three sub pixels which are Red, Blue, and Green. When all three sub pixels are switched on, the three colors appear to be emitted from the same point and the eye sees white light. When the sub pixels are switched on and off for various time periods the light emitted from the three sub pixels appears as various colors.

Edge lit back light systems are composed of one or more light guides as shown in prior art FIGS. 1 and 12 of U.S. Pat. No. 7,963,687, to further direct the light from the light guide(s) and diffuse the light before it is allowed to enter the LCD panel. If the light is not diffused, distortions in the light, called pattering, would appear making the light output of the LCD panel distorted and unsightly.

Edge lit back light assemblies may also have air gaps between the LED emitters and the surface of the light guide that receives the light. The air gap is intended to allow the emitted light to spread and mix prior to entering the light guide structure. The light guides are typically composed of one or more plastic like panels selected for their specific light transmissive and reflective properties. These panels will typically have reflective films or materials on all of the edges with the exception of the portion of the edge where light is emitted into the panel to ensure that as much light as possible is available to be emitted out of the front of the panel toward the LCD display panel.

The back surface of an edge lit LED panel light guide is designed such that the guide panel emits light in one direction only, from the back surface of the panel to the front surface of the panel where it is emitted. The back surface of the panel, prior art FIGS. 3 and 5 from U.S. Pat. No. 7,963,687, will typically be reflective or contain structures that reflect and redirect light to the front surface of the light guide panel. Those light guides with reflective back surfaces may be made so by any of a number of means including plated coatings and reflective films. Light guides lacking a plated or reflective film on the back surface may have reflective structures, '687 FIGS. 4A through 4D, pressed or molded into the back surface. These structures may be comprised of prisms and or lens as shown in the prior art figures. Light guides lacking a reflective back surface or a back surface with reflective structures may have an additional sheet of reflective structures adhered around it's perimeter with an air gap between the sheet and the back surface of the light guide. These sheets of reflective structures are typically prisms and or lens as shown in the prior art figures.

Diffuser panels, prior art FIG. 3 reference 27, are placed between the light guide assembly and the back surface of the LCD panel. Light emitted from the front surface of the light guide assembly will have some patterning regardless of the reflective films, prisms and lens and other films and structures to minimize light patterning. A diffuser is used to further blend the light from the light guide into a uniform beam before the light enters the LCD panel. So as to ensure a homogenous beam, an air gap is generally present between the front surface of the diffuser and a polarizer sheet or film and the back surface of the LCD array panel. The air gap between the diffuser and the polarizer sheet gives the light leaving the diffuser a better opportunity to mix resulting in an attenuation of any remaining pattering.

Polarizers

The last part of a backlight assembly is a polarizer sheet. The polarizer is composed of one or more films that contain very specific polarization properties. LCD panels are composed of LCD light gates where the gate material is a polarized element. If the light entering the gate is not polarized, some of the light will be attenuated because it will not be in phase with the polarized LCD pixel gate. If the light entering the gate is polarized, then the light entering the LCD gate will be less attenuated. In order to ensure that light entering the LCD panel from the diffuser is polarized, a polarizer film(s) is placed between the front surface of the diffuser and the back surface of the LCD array panel. An air gap will generally be present between the emitting surface of the diffuser and the polarized film.

SUMMARY

The present application describes display systems that allow for very thin back lighting panels that negate the disadvantages of edge lit and direct LED backlighting panels. The present invention results in backlighting panels that do not need light guides, diffusers and air gaps to provide even and homogenous light to the back of a LCD array panel.

DETAILED DESCRIPTION

The present invention describes using a Field-Induced Polymer Electro-Luminescence (FIPEL) technology to form a display. FIPEL was developed as an area lighting device that produces larger quantities of light for a given size panel than previous electro-luminescence (EL) panels which are well known in the art. FIPEL panels operate on alternating current. The frequency of the current is higher than 60 or 50 Hz normally used to power EL panels.

Embodiments describe replacing LED Edge Lit backlight panels for LCD displays. These displays are used for televisions, desktop and laptop computer displays, tablet computers, appliance and consumer electronics devices, PDAs, mobile devices such as cell phones and wired and wireless telephones, PDAs, instrument displays for vehicles and various test equipment devices, large commercial display such as stadium displays, add on lightings such as television back directed lighting and bezel lighting, and other various lighting through LCD display panels.

FIPEL panels are simple and inexpensive to construct.

Figure 1:
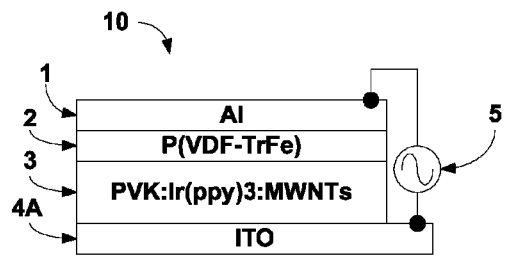
FIG. 1 shows a depiction of an asymmetrical (single dielectric layer) FIPEL light emitting device which emits light only from its front surface.
Figure 2:
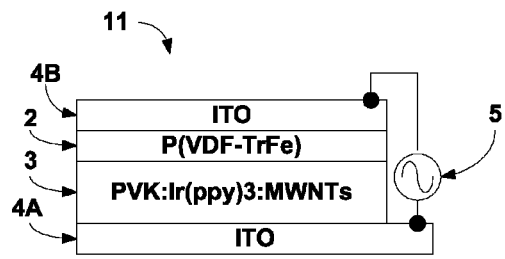
FIG. 2 shows a depiction of an asymmetrical (single dielectric layer) FIPEL light emitting device which emits light from its front and back surfaces.
Figure 3:
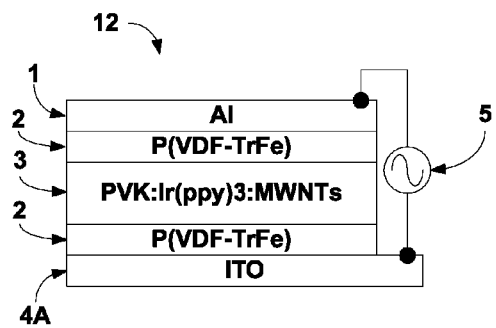
FIG. 3 shows a depiction of a symmetrical (dual dielectric layers) FIPEL light emitting device which emits light only from its front surface.
Figure 4:
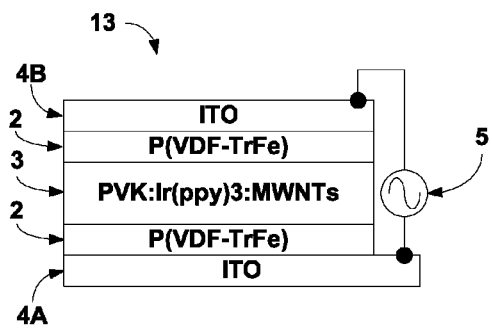
FIG. 4 shows a depiction of a symmetrical (dual dielectric layers) FIPEL light emitting device which emits light from its front and back surfaces.

FIGS. 1-2 illustrate single dielectric FIPEL devices and FIGS. 3-4 illustrate dual dielectric FIPEL devices. The differences between the two groups deal with the direction of emitted light. The basic construction of FIPEL devices is discussed in the following.

Lab quality FIPEL devices are generally fabricated on glass substrates with various coatings such as aluminum and Indium tin oxide (ITO). ITO is a widely used transparent conducting oxide because of its electrical conductivity and optical transparency, as well as the ease with which it can be deposited as a thin film. Because of this, ITO is used for conducting traces on the substrates on many LCD display screens. As with all transparent conducting films, a compromise must be made between conductivity and transparency, since increasing the thickness and increasing the concentration of charge carriers will increase the material's conductivity, but decrease its transparency. The ITO coating used for the device discussed here is approximately 100 nm in thickness. In the figures, the ITO coated glass substrates are identified by the reference number 4A throughout.

The other substrate, assembly 1, is aluminum (Al) deposited on a glass substrate. The resulting thickness of the Al deposition is sufficient to be optically opaque. The Al deposit on the glass substrate acts as an electrode and reflector to ensure light from the emissive layer 3 is directed through the ITO substrate layer 4A for devices illustrated in FIGS. 1 and 3.

Each device includes a dielectric layer identified by the reference number 2 throughout. The dielectric layer is deposed on the opposite side of the top substrate layer of either Al in the FIGS. 1 and 3 embodiment, or in the ITO layer in the FIGS. 2 and 4 embodiment.

The dielectric layer 2 is composed of a copolymer of P(VDF-TrFE) (51/49%). The dielectric layer is generally spin coated against the glass side of the top layer (insulated side) and the ITO (conductive) side of the bottom glass substrate. In all cases the dielectric layer is approximately 1,200 nm thick, but different embodiments can have different thicknesses.

The emissive layer (reference number 3 throughout) is composed of a mix polymer base of poly(N-vinylcarbazole): fac-tris(2-phenylpyridine)iridium(III) [PVK:Ir(ppy)3] with Medium Walled Nano Tubes (MWNT). The emissive layer coating is laid onto the dielectric layer 2 to a depth of approximately 200 nm. According to tests, the greatest light output the concentration of MWNTs to the polymer mix is approximately 0.04% by weight.

FIGS. 1 and 2 are embodiments of asymmetrical devices, where the stack includes dielectric 2 on only one side of the emissive layer 3. FIGS. 3 and 4 are embodiments of symmetrical devices where the stack includes dielectrics 2 on both sides of the emissive layer 3.

When an alternating current provided by signal generator 5 is applied across the devices shown in FIGS. 1 and 2 (asymmetrical devices) and 3 and 4 (symmetrical devices), the emissive layer emits light at specific wavelengths depending on the frequency of the alternating current. The alternating current is applied across the conductive side of the top layer (reference number 4B) and the conductive side of the bottom layer (reference number 4A). Light emission comes from the injection of electrons and holes into the emissive layer. Holes follow the PVK paths in the mixed emissive polymer and electrons follow the MWNTs paths. Signal generator 5 may be fixed, as to the frequency it provides to a FIPEL device or it may be control by a computer where the frequency is determined based on algorithms and data contained within content that will be displayed.

Carriers within the emissive layer then recombine to form excitons, which are a bound state of an electron and hole that are attracted to each other by the electrostatic force or field in the PVK host polymer, and are subsequently transferred to the Ir(ppy)3 guest, leading to the light emission.

Modern LCD digital televisions have undergone an evolution of back light systems starting with Cold Cathode Florescence Light sources, to LED scanning edge lit systems to non-scanning LED edge lit systems. LED Edge Lit backlights are formed of one or more panels that function as light guides or light pipes in that they control the direction of light emitted into the light guide panel and change the light direction such that it is emitted out the front of the light guide.

Figure 5:
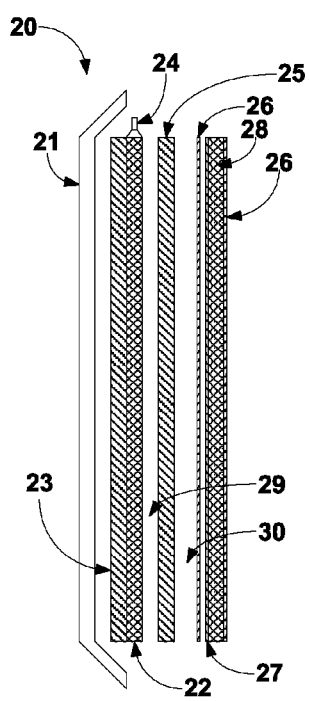
FIG. 5 shows a depiction of a typical edge lit LED backlighting system showing all of the components and a depiction of the assembly of a LCD array panel.

An edge lit LED backlight system 20 generally has one or more LEDs as shown in FIG. 5. In this depiction of an edge lit backlight system, note that object 21 is a support structure to which the components are fastened. The fastening devices for the panel are not shown in this depiction for the sake of clarity. Component 22 is a clear plastic panel such as polycarbonate. A LED backlight system may be formed of several narrow panels or a single panel that is the size of the LCD panel assembly 26-27-28.

An LED 24 is shown at the edge of the panel with a reflector cone. An air gap separating the LED from panel 22. Panel 22 will generally have some reflective surface, such as a reflective tape (not shown), attached to all of the edges except for that area in front of LED 24 which is the area covered by the air gap. An air gap is used between the LED and the edge of panel 22 to allow more emitted light to enter panel 22.

Panel 22 will also generally have a reflective back surface 23 to redirect light attempting to exit panel 22 at the back of the panel. The reflective surface is depicted as object 23. Object 23 may be a reflective film or a reflective panel with microlens and/or reflective structures such as lenses and prisms molded into its back surface. Micro lens and micro prisms are well known in the art for reflecting and directing scattered light in a known direction. Object 23 improves the efficiency of light guide panel 22 to emit light toward object 25 which is a diffuser panel.

Light being emitted by light guide panel 22 may have distortions such as ring, lines or bands of brighter and darker light due to light being scattered in patterns in light guide 22. Diffuser 25 scatters light entering the surface between light 24 and diffuser 25. Note also that an air gap may be present between light guide 22 and diffuser 25 to further allow light emitted from light guide 22 more of an opportunity to mix and soften edges of light patterns.

Diffuser 25 scatters the light into multiple directions further mixing it into a homogenous beam that is emitted out of the opposite surface of diffuser 25 toward the LCD panel assembly 26-27-28.

The LCD panel is made up of LCD gates which represent the pixels on a LCD display panel. Each pixel is further composed of three sub-pixels. A colorizer film 27 is placed on the back of LCD panels. The area of the colorizer film 27 that resides behind each pixel will be colored either red, blue or green so that white light from the back light system that enters the sub-pixel will be colored. This innovation reduces the number of LEDs needed to provide light from the back light system. In the past backlights contained red, blue and green LEDs that were strobed in a time sequential manner so that LCD gates had to be turned on and off three times as often as they are with sub-pixels receiving colored light simultaneously through the color filter film.

LCD gates that make up the LCD panel are able to pass or not pass light based on a strand of polarized material in the gate that is rotated when a charge is placed across the individual gate. So as to pass a maximum amount of light through the gate, the light entering needs to be polarized to the same polarity as the gate. Element 26 of LCD panel 26-27-28 is a polarization film that ensures that light entering LCD panel 26-27-28 is properly polarized.

As light leaving or being emitted from the LCD gates is still polarized, second polarization film, also referenced as 26, is placed on the front of the LCD panel. This polarization film cleans up any scattering of light leaving the front of the LCD gates and improves the viewing angle of the display panel.

The inventor recognizes that FIPEL light emitting panels provide the opportunity to replace LED edge lit back lighting systems with a lower cost and lower parts count device. The typical LED edge lit backlight assembly as shown in FIG. 5 has a light guide/pipe, an array of LEDs mounted to one of the edges of the assembly, a back reflector object 23 to redirect scattered light back through the light guide 22, a diffuser 25 to blend the light from the light guide 22 and two air gaps shown as 29 and 30.

Figure 6:
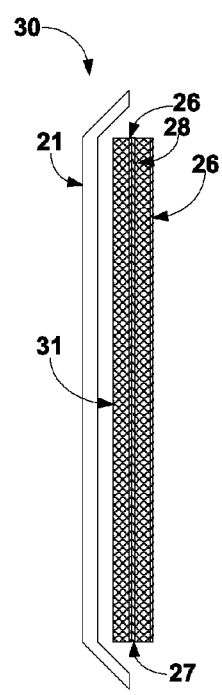
FIGS. 6 and 7 show embodiments using the FIPEL light emitting device.

A first FIPEL backlight system as shown in FIG. 6 is formed of a FIPEL module 31, which emits light directly from its transparent surface. The FIPEL module can be any of the modules shown in FIGS. 1 and 3. The FIPEL modules need no reflective sheet or device module at their back to redirect scattered light. FIPEL modules do not need reflective devices around the edges of the module to redirect light that would otherwise emit from the edges as does the LED edge lit backlight system. There is no LED array needed to inject light into the module. FIPEL module 31 emits light only in one direction evenly from its flat emission surface. The emitted light contains no distortion pattern, so a diffuser panel 25 is not necessary nor are the air gaps 29 and 30, normally found on each side of the diffuser as shown in FIG. 6.

In Total the FIPEL panel contains one component. The typical LED edge lit backlight assembly has 6 components including the two air gaps and the additional supporting structure (not shown) required for the air gaps.

FIPEL panel 31 is shown mounted directly to the polarizer film 26, color film 27 and LCD panel 28. This further decreases the parts count for supporting structures.

Figure 7:
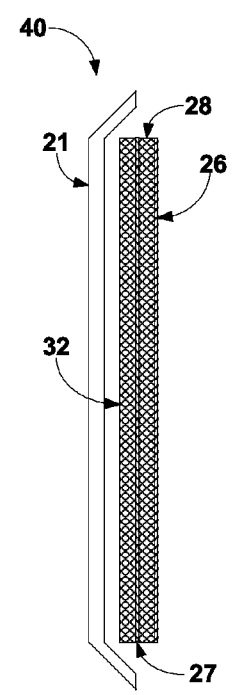

A further refinement of FIPEL backlight systems is shown in FIG. 7. In this embodiment, the first polarization film 26 is attached to the emitting surface of FIPEL device 4A of FIG. 5. The polarization film 26 is part of the FIPEL device manufacturing process and become another part of the basic assembly. The addition of polarization film 26 to the FIPEL device makes assembly of the LCD panel simpler with only the color film to be aligned and bonded to the LCD panel.

A further refinement of FIPEL backlight systems includes the 4A substrate plated with ITO on the side facing the PVK layer 3 polarized on the emissive or front side facing the color film between the LCD panel and the FIPEL device. This refinement results in the elimination of another component, specifically the first polarizer file sheet 26.

Both of the FIPEL devices 31 and 32 shown in FIGS. 6 and 7 are substantially thinner than a LED edge lit backlight assembly. If we assume that the two glass substrates are 0.020 each in thickness and the Al coating is approximately 100 nm, the dielectric layer is approximately 1,200 nm, the emission layer is approximately 200 nm and the ITO layer is approximately 100 nm. The total resulting thickness is approximately 0.040 inch, more specifically, less than 0.1 inches thick.

LED edge lit assemblies, depending on the reflector sheet behind the light guide can approach 0.250 inch which is some six times thicker than the FIPEL device of an embodiment.

The differences between the two technologies can allow for the FIPEL device/module to be mounted directly to the back surface of the LCD panel. This simplifies the manufacturing process (less manual touching of the panel) and allows for the plastic back of the display screen to become the supporting device with less or no metal resulting in a weight savings and a substantially thinner product.

This can also be used with the new Samsung screen technology called Electrowetting Displays which may have backlights or have only have reflective back surfaces that reflect ambient light. A FIPEL panel of the type shown in FIG. 5 can provide both. When the FIPEL panel is active with this type of display, the display is using a backlight in low ambient light environments. When the FIPEL panel is turned off, the reflective back surface of the FIPEL panel is reflective allowing the display to be used in high light environments. This gives the Electrowetting Display the best of both worlds.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sizes and thicknesses can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display system, comprising
   an emissive body, formed of a first substrate having a first conductive thin film, a dielectric layer formed directly on said first substrate, an emissive layer, formed directly on the dielectric layer, said emissive layer has mixed polymer and a second substrate having a second conductive thin film thereon, formed on a said emissive layer,
   said emissive body having a flat light emitting surface, said emissive body emitting light continuously and evenly from a whole area of the flat light emitting surface, and said emissive body emitting light continuously and evenly over a whole area of light incident surface of a pixel controllable device, said pixel controllable device, having a polarizer film connected directly to the light emitting surface without an air gap, a color film connected to a polarizer film without an air gap, and a pixel controllable panel connected to the color film without an air gap; and a signal generator, outputting an alternating current between said first conductive thin film and said second conductive thin film, to cause the emissive layer to emit light at specific wavelengths depending on the frequency of alternating current.

2. The display system as in claim 1, wherein said emissive body has a thickness less than 0.1 inch over the area.

3. The display system as in claim 1, wherein said emissive body emits light from both a front and a back of the area.

4. The display system as in claim 1, wherein the display system has a front shell and a rear shell.

5. The display system as in claim 4, wherein the rear shell is formed of a non-reflective material.

6. The display system as in claim 1, wherein said pixel controllable device is a liquid crystal device or an electrowetted device.

7. The display system as in claim 1, wherein the display system is a television.

8. This display system as in claim 6, wherein the display system is in a portable computer.

9. The display system as in claim 8, wherein said portable computer is one of a tablet, cell phone, PDA.

10. The display system as in claim 1, wherein said pixel controllable device having a TFT, or said pixel controllable device is operated in VA mode or IPS mode.

11. The display system as in claim 1, wherein said emissive body has a non-symmetrical stack of materials from its top to its bottom.

12. The display system as in claim 1, wherein said emissive body has a symmetrical stack of materials from its top to its bottom.

13. The display system as in claim 1, further comprising a connection to a computer that creates an output signal that sets said frequency of the alternating current.

14. The display system as in claim 1, wherein said first and second substrates are glass substrates.

15. The display system as in claim 1, wherein said emissive layer is a mix of poly (N-vinylcarbazole):fac-tris (2-phenylpyri-dine)iridium(III) with Nano Tubes therein.

16. The display system as in claim 15, wherein a concentration of Nano Tubes to the polymer mix is approximately 0.04% by weight.

17. A display system, comprising a housing, having a rear part, and a front part, having an area for a display in said front part;

an emissive body having a flat light emitting surface, and said emissive boy emitting light continuously and evenly from a whole area of the flat light emitting surface, and emissive body emitting light continuously and evenly over a whole are of a light incident surface of a pixel controllable device, and said emissive body attached directly against said rear part of said housing, said emissive body, formed of a substrate having a first conductive thin film, a dielectric layer formed directly on said first substrate, an emissive layer, formed directly on the dielectric layer, said emissive layer has a mixed polymer and a second substrate having a second conductive thin film thereon, formed on said emissive layer;

said pixel controllable device, having a polarizer film connected directly to the light emitting surface without an air gap, color film connected to the polarizer film without an air gap, and a pixel controllable panel connected to the color film without an air gap; and a signal generator, outputting an alternating current between said conductive thin film and said second conductive thin film, to cause the emissive layer to emit light at specific wavelengths depending on the frequency of the alternating current.

18. The display system as in claim 17, wherein said emissive body has a thickness less than 0.1 inch over the area.

19. The display system as in claim 17, wherein said emissive body emits light from both front and back of the display.

20. The display system as in claim 17, wherein the rear part is formed of a non-reflective material.

21. The display system as in claim 17, wherein said pixel controllable device is a liquid crystal device or an electrowetted device.

22. The display system as in claim 17, wherein the display system is a television.

23. The display system as in claim 17, wherein the display system is in a portable computer.

24. The display system as in claim 23, wherein said portable computer is one of a tablet, cell phone, PDA.

25. The display system as in claim 17, wherein said pixel controllable device having a TFT, or said pixel controllable device is operated in VA mode or in IPS mode.

26. The display system as in claim 17, wherein said emissive body has a non-symmetrical stack of materials from its top to its bottom.

27. The display system as in claim 17, wherein said emissive body has a symmetrical stack of materials from its top to its bottom.

28. The display system as in claim 17, further comprising a connection to a computer that creates an output signal that sets said frequency of the alternating current.

29. The display system as in claim 17, wherein said first and second substrates are glass substrates.

30. The display system as in claim 17, wherein said emissive layer is a mix of poly (N-vinylcarbazole):fac-tris (2-phenylpyri-dine)iridium(III) with Nano Tubes therein.

31. The display system as in claim 30, wherein a concentration of nanotubes Nano Tubes to the polymer mix is approximately 0.04% by weight.

* * * * *